United States Defensive Publication [19] (H) [11] T988,006

Phillips, Jr. et al. [43] Nov. 6, 1979

[54] CHEMICAL BENEFICIATION OF PHOSPHATIC LIMESTONE AND PHOSPHATE ROCK WITH α-HYDROXYSULFONIC ACIDS

[75] Inventors: John F. Phillips, Jr., Florence; Guerry H. McClellan, Killen; John F. McCullough, Florence, all of Ala.

[73] Assignee: Tennessee Valley Authority

[21] Appl. No.: 940,940

[22] Filed: Sep. 11, 1978

[51] Int. Cl.[2] ..... C01F 5/42; C01F 11/48

[52] U.S. Cl. ..... 423/167

[57] ABSTRACT

A method of selectively extracting calcite and dolomite away from apatite in phosphate rock or phosphatic limestone wherein the phosphate rock or phosphatic limestone is treated with a mixture of sulfur dioxide, water, and a carbonyl compound. Solids are separated from the liquid phase. The solids consist principally of apatite admixed with clay, quartz, and other accessory minerals originally in the rock. The solids are heated to drive off adhering sulfur dioxide, water, and carbonyl. The liquid phase consists of carbonyl, water, sulfur dioxide, and magnesium and calcium ions. Heating this liquid preferentially precipitates $CaSO_3.\frac{1}{2}H_2O$. This solid is filtered off and the filtrate further heated to precipitate $MgSO_3.3H_2O$ largely free of $CaSO_3.\frac{1}{2}H_2O$. All offgas and filtrate is returned to the process. Examination of extraction results shows that high temperature extraction favors dolomite extraction and low temperature extraction favors apatite extraction. Thus, operating at elevated temperature allows dolomite to be selectively extracted from the apatite in phosphate rock.

6 Claims, 1 Sheet Drawing,

50 Pages Specification

The file of this unexamined application may be inspected and copies thereof may be purchased (849 O.G. 1221, Apr. 9, 1968).

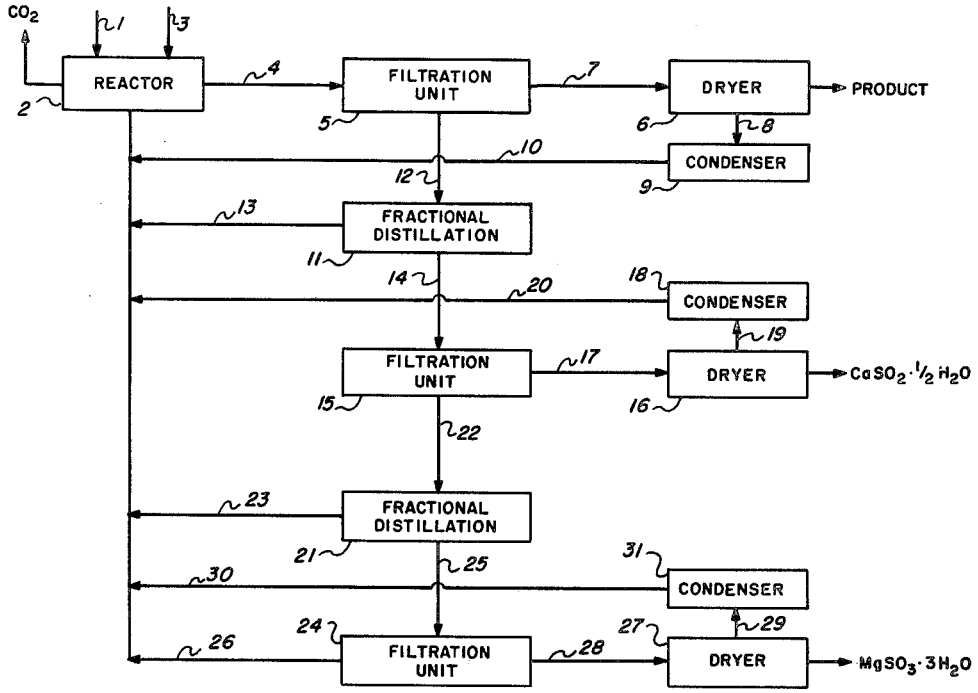

PREPARATION OF APATITE CONCENTRATE FROM PHOSPHATIC LIMESTONE

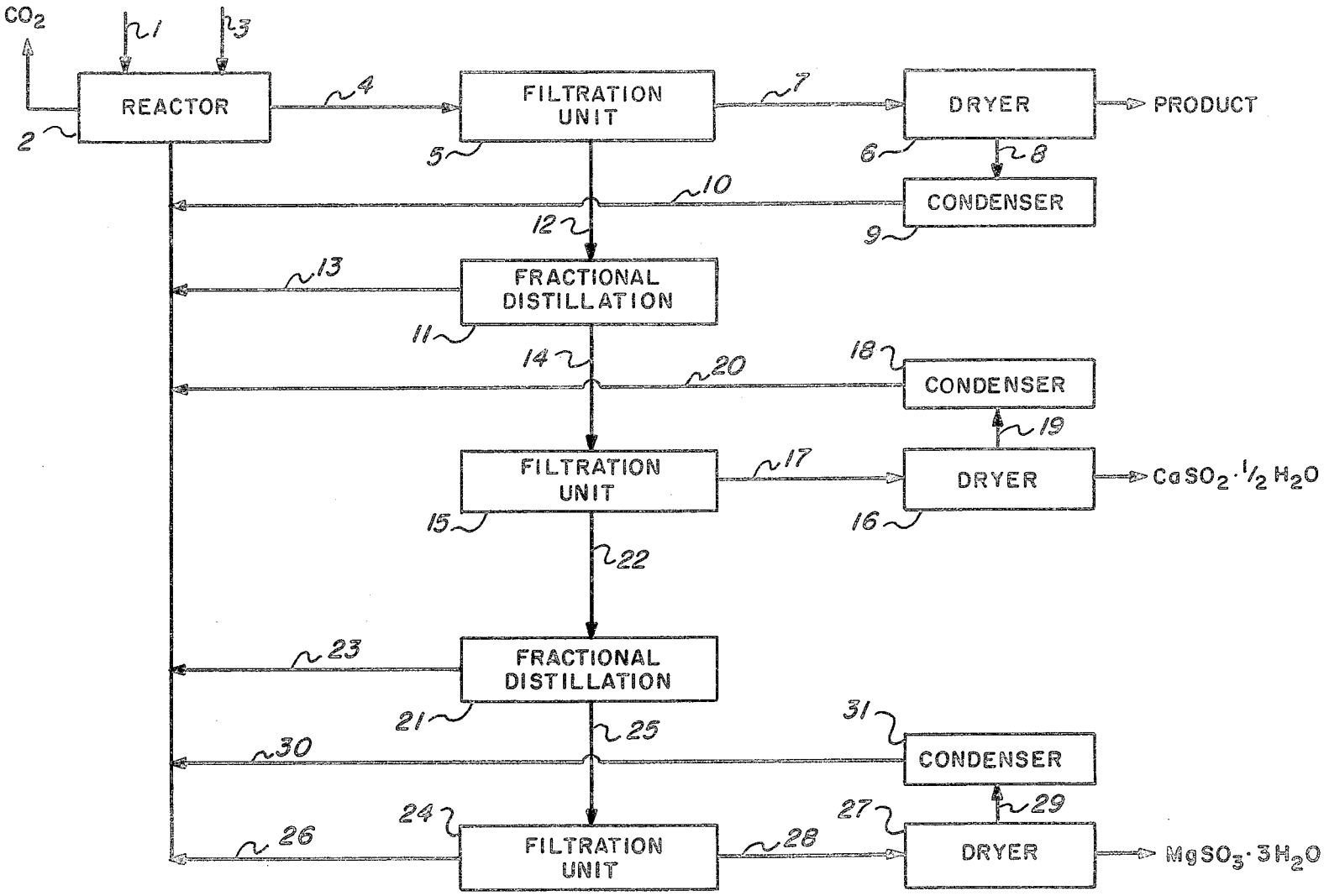
PREPARATION OF APATITE CONCENTRATE FROM PHOSPHATIC LIMESTONE